United States Patent [19]

Schwartz

[11] Patent Number: 4,872,640
[45] Date of Patent: Oct. 10, 1989

[54] VALVE APPARATUS

[76] Inventor: John E. Schwartz, 1642 Buckhorn La., Billings, Mont. 59105

[21] Appl. No.: 185,082

[22] Filed: Apr. 25, 1988

Related U.S. Application Data

[63] Continuation-in-part of Ser. No. 865,806, May 22, 1986, abandoned.

[51] Int. Cl.[4] ............................................. F16K 31/126
[52] U.S. Cl. ..................................... 251/147; 251/61.4
[58] Field of Search ........................ 251/61.4, 147, 144

[56] References Cited

U.S. PATENT DOCUMENTS

| | | | |
|---|---|---|---|
| 2,109,870 | 3/1938 | Thwaits ............................... 251/147 |
| 2,545,192 | 3/1951 | Bugno ............................. 251/147 X |
| 2,604,292 | 7/1952 | Butcher .............................. 251/147 |
| 2,882,008 | 4/1959 | Giauque ............................. 251/61.4 |
| 3,215,398 | 11/1965 | Etris et al. ........................... 251/147 |
| 3,257,093 | 6/1966 | De Frees ............................ 251/61.4 |
| 3,556,465 | 1/1971 | Little ................................ 251/147 X |
| 3,786,962 | 1/1974 | Van Linder ..................... 251/147 X |

*Primary Examiner*—John Fox
*Attorney, Agent, or Firm*—Wallenstein, Wagner & Hattis, Ltd.

[57] ABSTRACT

The invention is a normally-closed valve apparatus for mounting within a vessel containing a product, such as a fluid, gas, or liquid. The valve apparatus comprises an actuator assembly. It also comprises a valve body assembly having a product passage with continuous walls free of openings. A valve assembly having a valve seat is also provided. The actuator assembly includes at least one draw bar straddling the valve body assembly and a sealing member. The sealing member is movable by the draw bar away from its normal engagement with the valve seat to open the valve and allow passage of the product through the valve apparatus.

4 Claims, 1 Drawing Sheet

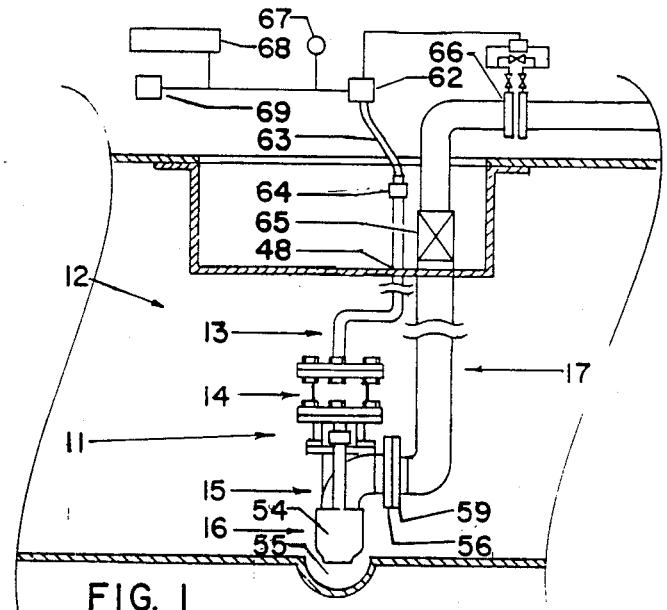
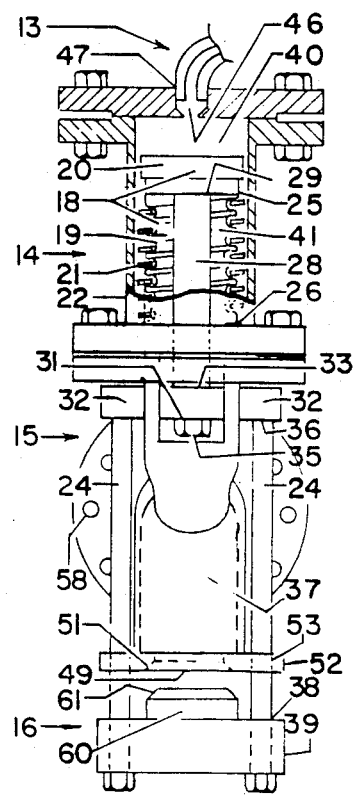
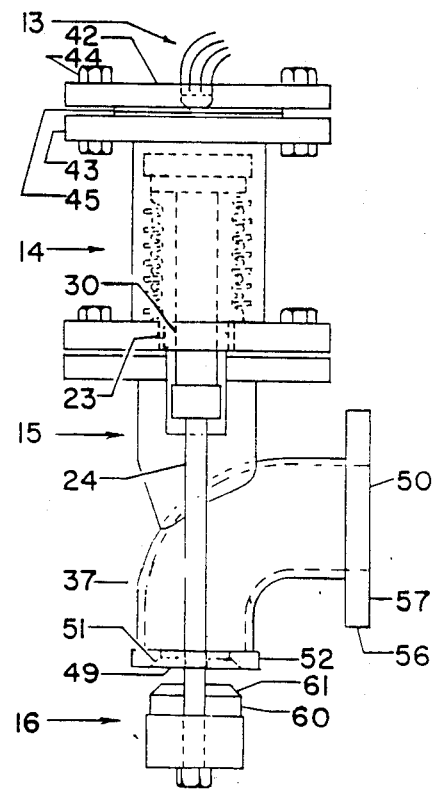

VALVE APPARATUS

REFERENCE TO RELATED APPLICATION

This application is a continuation-in-part of U.S. application Ser. No. 865,806, filed on May 22, 1986, now abandoned.

DESCRIPTION

1. Technical Field

This invention relates to a novel valve apparatus, and more particularly to a new safety valve apparatus.

2. Background of the Invention

Over the last century, the use of chemicals has become much more common. Chemicals are utilized as raw materials in the manufacture of building materials, home furnishings, vehicles, and personal and household products. In addition, chemicals are used to treat various natural and processed materials, such as wood and metals. Thus, chemicals have been important in creating and maintaining our high standards of living.

Although some chemicals are relatively inert and inactive, and can be handled easily without special precautions, other chemicals are toxic, flammable or hazardous. Such hazardous chemicals must be handled and stored carefully.

Chemicals are sold and used in concentrated form. For example, gases may be liquified and stored in a pressurized state. This concentration can increase both handling and safe storage problems.

Due to the growing needs of modern chemical plants, ever larger quantities of hazardous materials are stored in specially constructed tanks and in process vessels such as reactors and fractionation columns. Known technology can be employed to design a vessel to confine the chemicals, and to withstand adverse forces that the tank may encounter.

The function of nozzles, valves, and other fixtures necessitate their location on the outside surface of a vessel, where they are connected to sprawling plant transfer piping systems. It is difficult to adequately design these systems so as to ensure the same high degree of safety as that provided by the vessel itself. These systems may extend from vessel to vessel, or from vessel to many parts of a chemical process plant. Thus, the systems are exposed to the destructive forces of both heat from fire and impact from moving objects.

In recent years, there have been attempts to provide a greater degree of safety in the handling of hazardous chemicals through special limit flow valves used on the inlet and outlet nozzles of vessels. These limit flow valves are set to close at a predetermined flowrate of product, such as the flowrate that may be experienced if a pipe is broken. These valves have three major faults:

1. They are bolted to the exterior of the tank, and very often to the outer end of the nozzle. Thus, they are vulnerable to the heat of fire and to impact.
2. They have a set closing point, which is controlled either by a spring or by the weight of a ball check inside of the valve body. These set points cannot be altered unless the vessel is emptied, and the limit flow valve removed and disassembled. The set closing point must be set for a flow slightly above the maximum draw anticipated. Any lesser flow is not checked. Thus, if an accident resulted in an uncontrollable leak, but at a lesser flow than the valve's set closing point, the fluid would continue to leak from the tank until it is was emptied.
3. The limit flow valves all have an on-off stem that moves, and which is sealed with a packing that is susceptible to leaks.

Thus, hazardous chemical storage vessels are not now adequately protected against the loss of their contents. Greater volumes of chemicals are concentrated in the vessels of process plants, storage tanks, and other tanks, such as highway transports and railroad cars. It is important to contain these volumes in their vessels if an accident occurs. Vessels can resist catastrophic occurrences much more successfully than transfer piping and protrusions, such as nozzles and fixtures.

SUMMARY OF THE INVENTION

The present invention provides a novel valve apparatus which overcomes the shortcomings and deficiencies of previous valve designs. The valve apparatus of the invention exhibits a high degree of safety and reliability, especially as a safety shut-off valve under adverse conditions. The valve apparatus is located in a sheltered position within the vessel itself. Also, the valve apparatus is constructed to eliminate all projecting components. This construction minimizes mishaps caused by human error, fire, vandalism, impact, forces of nature, and the like.

The valve apparatus of the invention is simple in design and can be produced relatively inexpensively. Commercially available materials and components can be employed in its fabrication. Conventional manufacturing techniques and procedures can be utilized.

The valve apparatus is leak-resistant, shock-resistant, fireproof and corrosion-resistant. The valve apparatus is durable in construction and will likely provide a long useful life, with little or no maintenance.

The operation of the valve apparatus of the invention is relatively fail-safe, with the valve closing automatically upon withdrawal of the opening or actuating force. The valve apparatus can be operated easily and conveniently by semi-skilled workmen after a minimum of instruction. The response of the valve apparatus can be changed easily and simply. Thus, the point at which the valve is set to close can be readily changed to compensate for changes in flow rate and/or pressure of the chemicals being discharged from the vessel.

These and other benefits and advantages of the novel valve apparatus of the present invention will be apparent from the following description and the accompanying drawings. Although this novel valve apparatus is suitable for use in virtually any containing vessel, its use in a railroad tank car will be shown and described.

BRIEF DESCRIPTION OF THE DRAWINGS

FIG. 1 is a cross section of a railroad tank car, with the section being taken along the axis of the tank. The Figure shows a recessed area, instead of a dome, in which outside valves and connections to the tank are situated. This Figure also shows piping and various support controls that are optional to the tank car.

FIG. 2 is a rear view of the novel valve apparatus, with part of the actuator housing cut away, and taken along lines 2—2 of FIG. 1.

FIG. 3 is an enlarged view of the lower portion of FIG. 1, and shown partially in section.

DETAILED DESCRIPTION OF THE PREFERRED EMBODIMENT

As shown in FIG. 1 of the drawings, one form of the novel valve apparatus 11 of the present invention is mounted within a vessel 12 that contains fluid, gas, or liquid, usually under pressure. The vessel 12 may be a stationary tank, a process vessel, a railroad tank car as shown, a highway transport tanker, or the like. The valve apparatus 11 includes an actuating fluid conduit 13, an actuator assembly 14, a valve body assembly 15, a valve assembly 16, and a product conduit 17.

FIGS. 2 and 3 are two views of a preferred assembly of the mechanical portion of this novel valve apparatus 11, again illustrating the actuator assembly 14, valve body assembly 15, and valve assembly 16.

The actuator assembly 14 of the novel valve apparatus 11 includes an actuator housing 22. The actuator housing 22 contains a movable sealing member 18, which divides the space within the actuator housing into two compartments, a first compartment 40 and a second compartment 41. These separated compartments 40 and 41 are filled, respectively, with the actuating fluid and with the product stored in vessel 12.

The movable sealing member has two portions. One is flexible bellows-like portion 19, and the other is a rigid portion 20. The rigid portion is a central component of the movable sealing member. The flexible portion occupies a peripheral position around the rigid portion, and the interior of the flexible portion defines the second compartment 41. The flexible portion and the rigid portion are joined at point 25 in a procedure that will ensure against high-pressure leakage. One such dependable procedure may be thermal welding. The flexible, bellows-like portion is preferably made of stainless steel, and may be thermally welded to the actuator housing at point 26 through a similar procedure.

The actuator assembly 14 of the valve apparatus 11 also includes an elongated rod 28 which has one end securely attached to the top center 29 of the rigid portion 20 of movable sealing member 18. The elongated rod 28 extends below and beyond the actuator housing 22, and then through a first yoke 32. This yoke 32 is a portion of the actuator assembly 14 of the valve apparatus 11. The elongated rod 28 is securely attached at point 33 to the center of the first yoke 32.

The elongated rod 28 terminates with a nut 31 at 35. As may be seen in phantom in FIG. 3, the elongated rod 28 extends out of the actuator housing and passes through a slip fitting guide hole 30. This guide hole is provided only as a bearing surface for the elongated rod 28, and neither comprises nor requires a seal.

The actuator assembly 14 of the valve apparatus 11 includes two draw bars 24. One end of each draw bar 24 is connected at 36 to the first yoke 32. The draw bars are of equal length, and extend away from and straddle the valve body assembly 15. This construction avoids the need for a long, straight extension of the elongated rod 28 to a point within valve body assembly 15, which would require a packing seal to isolate the product in chamber 12 from the product in passage 37. Eliminating the need for such seals is an important aspect of the present valve apparatus. The two draw bars 24 connect at point 38 to a second yoke 39 that is part of the valve assembly 16 of the valve apparatus 11. The operation of this valve assembly will be discussed below.

The actuator assembly 14 of the novel valve apparatus 11 includes two holes 23 (FIG. 3). These holes 23 are bored in the area of the actuator housing 22 that is adjacent the second compartment 41. Normally, this second compartment 41 is filled with product from vessel 12. These two holes 23 permit free passage of product between vessel 12 and second compartment 41.

The actuator assembly 14 of valve apparatus 11 includes a connecting flange 42 secured with nuts and bolts 44 to boss 43. The flange 42 is also sealed to boss 43 with gasket 45.

Flange 42 includes bored hole 46. Hole 46 is shaped to permit entry of an actuating fluid conduit 13 in socket-like relationship. A seal weld 47 permanently joins the actuating fluid conduit 13 to flange 42. The other end of the actuating fluid conduit 13 extends through hole 48 (FIG. 1) in the shell of vessel 12. The conduit is welded to the shell at that hole 48 to form a strong and leak-proof bond.

The flange, boss, and gasket system facilitate installation and removal of the valve apparatus, should that become necessary. The system also allows the dependable attachment of the actuating fluid conduit 13 to the actuator assembly 14. The actuating fluid conduit 13 of valve apparatus 11 may be fabricated from thick-walled tubing, so that it doubles as a structural member and conduit.

The valve body assembly 15 includes a product passage 37. The walls of this product passage are continuous, with no opening except at the inlet and outlet. This eliminates the need for either packings or mechanical seals.

Valve body assembly 15 includes valve seat 51 surrounding the inlet 49 of product passage 37. This valve seat 51 is an integral part of the valve body assembly. Valve seat 51 may be shaped to accommodate several types of popular valve designs, including a sliding valve, plug valve, gate valve, or globe valve. Each of these valves will function well in connection with this invention.

In this embodiment, a globe valve assembly 16 will be illustrated and described. The seat of the globe valve is an inwardly sloping, symmetrical, conical surface.

The valve body assembly includes a flange 52 (FIG. 3) extending radially and outwardly from the axis of the inlet 49 of product passage 37. This flange has two purposes. The first is to create an extension outward from the valve body assembly through which two holes 53 can be bored. The holes serve as guides for the two draw bars 24 that both extend from the yoke 32 to the valve and straddle the valve body assembly. The other purpose of this flange 52 is to serve as a mounting surface for an extension 54 (FIG. 1) to be attached at the inlet 49 of the product passage 37 so that product can be withdrawn from a selected part of the chamber, including its extreme bottom 55 or even its top. Neither the guide holes 53 nor the point of attachment of the inlet extension 54 need be leak-proof, as they are within the vessel 12 rather than within the product passage 37.

The valve body assembly 15 also includes a flange 56, which extends radially and outwardly from the axis of the outlet 50 of product passage 37. This flange 56 is an integral part of the valve body assembly 15, and is either cast with or thermally welded to the valve body assembly. The face 57 of flange 56 is a flat, high quality surface suitable for receiving a gasket. The flange contains bolt holes 58 sufficiently large and numerous to ensure a high-pressure, non-leaking coupling.

Valve assembly 16 includes a second yoke 39, which in this embodiment is a rectangular bar-like element.

Each opposite end of the second yoke 39 has secured thereto one end 38 of draw bars 24.

In the center of the second yoke 39 is a cylindrical block 60 with its top corner beveled to form a continuous, outwardly facing surface 61 that forms a truncated, right circular cone. This cylindrical block 60 is concentric with valve seat 51 that leads into the inlet 49 of product passage 37. The outwardly facing surface 61 is of a slope and dimension that facilitates sealing engagement with the inwardly facing conical surface of valve seat 51. This sealing engagement will shut off the flow of product from the vessel 12 through the product passage 37, and then through conduit 17 to the outside of the chamber. The seal between the two conical surfaces will be enhanced if at least one of those surfaces is flexible and resilient. Modern polymers can provide the necessary flexibility and resiliency.

The valve apparatus includes product conduit 17, which is a heavy duty, thick-walled tube. The end of this conduit 17 that is proximate product passage 37 includes a flange 59. This flange 59 is shaped and sized to match outlet flange 56 of the product passage 37. When flanges 59 and 56 are secured with bolts and a suitable, intermediate gasket, a fluid-tight seal results.

The opposite end of the product conduit 17 extends through and is welded along a hole in the shell. This provides the conduit 17 with structural rigidity. In this way, product conduit 17 serves a double purpose, similar to the double purpose of actuating fluid conduit 13. Conduit 17 serves to transfer product from the vessel 12, and also acts as a structural member. As a structural member, it supports valve apparatus 11 and resists the stresses from the motion and pressure attributable to both the product in the chamber and external forces.

The product within vessel 12 will, from its own pressure, forcibly pass through holes 23, thereby filling second compartment 41. The force generated by the pressure of the fluid will push movable sealing member 18 upwardly, expanding the second compartment 41. Rigid portion 20 of movable sealing member 18 will also be moved upwardly. Movable sealing member 18 is attached, as previously described, to elongated rod 28, first yoke 32, draw bars 24, second yoke 39, and cylindrical block 60. Thus, upward movement of sealing member 18 results in the movement of cylindrical block 60 into engagement with valve seat 51. This engagement shuts off the flow of product through product passage 37 and product conduit 17. As is apparent from the above description, this closure results from forces within the vessel 12, with no need for any forces from without the chamber.

A spring 21 may advantageously be placed within the actuator housing 22. The spring 21 will act as an auxiliary force, moving sealing member 18 upwardly to shut off the flow of product in the event that the pressure from the product in vessel 12 is inadequate to close the valve assembly 16. It is apparent from all of the above that valve assembly 16 is normally closed.

If product is to be drawn out of vessel 12, actuating fluid is forced into actuating fluid conduit 13. This actuating fluid may be any suitable gas or liquid. The actuating fluid reaches conduit 13 through an outside conduit 63 (FIG. 1). Outside conduit 63 is secured to the actuating fluid conduit 13 by means of a coupling 64.

The actuating fluid is forced under pressure from a control mechanism 62 into conduit 63 and actuating fluid conduit 13. It then enters first compartment 40 within actuator housing 22. When the force generated in the first compartment by the pressure of the actuating fluid against the sealing member 18 is greater than the force from the pressure of the product in the second compartment 41 and the spring 21, the movable sealing member 18 will move downwardly and in the direction of the product passage 37. The downward motion permits more fluid to enter first compartment 40, and forces product out of second compartment 41 through holes 23. The downward motion of sealing member 18 in turn causes the downward motion of elongated rod 28, first yoke 32, draw bars 24, second yoke 39, and cylindrical block 60. This motion results in the disengagement of outwardly facing surface 61 from valve seat 51. This movement of the cylindrical block 60 and its surface 61 opens the inlet 49 of the product passage 37, allowing the free flow of pressurized product from the inside to the outside of the vessel 12 by way of passage 37 and product conduit 17.

This novel valve is a safety shut-off rather than a replacement of any currently used exterior valve. Such exterior valves are shown in FIG. 1, illustrating a standard throttle valve 65 installed outside of the vessel 12.

The present valve has no moving part which could require a frictional packing seal. This characteristic is attributable to the location of the valve within the chamber 12, and the lack of openings in product passage 37.

As indicated above, valve 11 is normally closed due to both the pressure from the product within the vessel 12 and the spring 21. The valve opens only when pressurized actuating fluid is forced into and maintained within the actuating fluid conduit 13.

The present valve is compatible with existing industrial devices. The pressure of the actuating fluid within the actuating fluid conduit 13 may be released by many different means. These means include a signal from a flow meter 66, which may be infinitely and readily adjustable; a signal from a panic button or other device 67 remote from the chamber 12; a detector 68 or monitor which samples the environment outside of the chamber 12 for evidence of pollution or fire; any process controller 69, such as a level or temperature controller; or a power failure. If fire, collision or any other event should destroy the actuating fluid controller 62 or the conduit 63, there would be a loss of pressure within the actuating fluid conduit 13, and valve 11 will close as a result.

The novel valve apparatus may be fabricated from a wide variety of materials, including metals, plastics, combinations thereof, and preferably corrosion-resistant materials such as stainless steel. The specific materials selected will depend upon the requirements of the specific chemicals with which the valve is used.

The above description and the accompanying drawings show that the present invention provides a novel valve apparatus, with features and advantages not found in previous valves. The valve apparatus closes automatically when fluid pressure within the chamber exceeds the force being applied, and in this way provides relatively fail-safe operation. The valve apparatus provides adjustable response levels. In the event of an emergency, the valve apparatus could be opened with a simple hand pump. Finally, the valve apparatus is fireproof, shock-resistant, leak-resistant, and minimizes risks attributable to human error, forces of nature, and vandalism.

It is apparent that various modifications in addition to those discussed above can be made in the valve apparatus without changing the scope of the present invention. The size, configuration, and arrangement of components can be changed to meet specific requirements. The connecting section can include one or more pivoting links to facilitate operation in limited space. Soft valve component surfaces can be employed to insure tight seals.

An assortment of compression and tension springs can be used to facilitate operation of the valve apparatus under special conditions. These and other changes can be made in the valve apparatus of the invention, provided the functioning thereof is not adversely affected. Therefore, the scope of the present invention is to be limited only by the following claims.

What I claim is:

1. A normally-closed valve apparatus for mounting within a vessel containing a fluid, gas, or liquid product, said valve apparatus comprising an actuator assembly; a valve body assembly having a product passage, said product passage having continuous walls that are free of openings; and a valve assembly having a valve seat; said actuator assembly including at least one draw bar straddling said valve body assembly; and said actuator assembly further comprising a sealing member, said sealing member being attached by said draw bar to a cylindrical block, and said sealing member being actuated by said product from within said vessel to thereby move said cylindrical block into engagement with said valve seat to shut the flow of product through said valve apparatus, and said cylindrical block being movable by said draw bar away from its engagement with said valve seat to open said valve apparatus and allow passage of said product through said valve apparatus.

2. The valve apparatus of claim 1, further comprising a spring to maintain said valve apparatus in said normally closed position.

3. The valve apparatus of claim 2, wherein said sealing member is disposed within said actuator assembly and has two portions, one of said portions being a flexible bellows-like portion defining a compartment, and the other of said portions being a rigid portion.

4. The valve apparatus of claim 1, wherein said sealing member is disposed within said actuator assembly and has two portions, one of said portions being a flexible bellows-like portion defining a compartment, and the other of said portions being a rigid portion.

* * * * *